(12) United States Patent
Kiyokami et al.

(10) Patent No.: US 12,246,865 B2
(45) Date of Patent: Mar. 11, 2025

(54) TAKEOFF AND LANDING ASSIST APPARATUS

(71) Applicant: TOYOTA JIDOSHA KABUSHIKI KAISHA, Aichi-ken (JP)

(72) Inventors: Hiroaki Kiyokami, Nisshin (JP); Masao Tajima, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 18/456,520

(22) Filed: Aug. 28, 2023

(65) Prior Publication Data

US 2023/0399132 A1  Dec. 14, 2023

(30) Foreign Application Priority Data

Sep. 1, 2022 (JP) ................. 2022-139111

(51) Int. Cl.
*B64U 70/95* (2023.01)
*B64F 1/18* (2006.01)

(52) U.S. Cl.
CPC ............... *B64U 70/95* (2023.01); *B64F 1/18* (2013.01)

(58) Field of Classification Search
CPC .... B64U 70/95; B64U 2101/64; B64U 70/00; B64F 1/18; B64C 39/024
See application file for complete search history.

(56) References Cited

U.S. PATENT DOCUMENTS

| | | | |
|---|---|---|---|
| 8,245,469 B2 * | 8/2012 | Rubel ................ | E04B 5/48 52/223.6 |
| 8,256,172 B2 * | 9/2012 | Benson ............. | E04F 15/02183 52/489.1 |
| 9,056,676 B1 * | 6/2015 | Wang ................. | B64U 80/86 |
| 9,126,693 B1 * | 9/2015 | Shi ..................... | B64U 10/14 |
| 9,290,277 B2 * | 3/2016 | You ................... | B64U 50/34 |
| 9,387,928 B1 * | 7/2016 | Gentry ................ | G05D 1/102 |
| 9,421,869 B1 * | 8/2016 | Ananthanarayanan ...... B60L 5/005 |
| 9,457,899 B2 * | 10/2016 | Duffy ................. | B64U 10/16 |
| 9,527,605 B1 * | 12/2016 | Gentry ................ | G05D 1/0094 |
| 9,551,989 B2 * | 1/2017 | Scarlatti ............. | G05D 1/00 |
| 9,589,448 B1 * | 3/2017 | Schneider ........... | F41H 9/10 |
| 9,643,722 B1 * | 5/2017 | Myslinski ........... | G06V 40/10 |
| 9,783,075 B2 * | 10/2017 | Henry ................ | G05D 1/654 |
| 9,957,045 B1 * | 5/2018 | Daly .................. | B64U 50/19 |
| 10,099,561 B1 * | 10/2018 | Ananthanarayanan ...... B60L 53/126 |
| 10,310,501 B2 * | 6/2019 | Greenberger ....... | H02J 7/342 |
| 10,719,080 B2 * | 7/2020 | Zhang ................ | B64F 5/60 |
| 10,967,970 B2 * | 4/2021 | Van Niekerk ....... | B64U 30/293 |
| D932,369 S * | 10/2021 | Passley .............. | D12/16.1 |

(Continued)

FOREIGN PATENT DOCUMENTS

| | | |
|---|---|---|
| DE | 102018205880 B3 | 7/2019 |
| JP | 2018-165205 A | 10/2018 |

*Primary Examiner* — Medhat Badawi (74) *Attorney, Agent, or Firm* — HAUPTMAN HAM, LLP (57) ABSTRACT

A stage has a takeoff and landing surface. The takeoff and landing surface has an opening through which loading and unloading to and from a flying object is carried out. The takeoff and landing surface has a plurality of markers formed thereon. Each marker is a figure or the like for identifying a relative position between the flying object and the stage. The opening is formed in the takeoff and landing surface such that an edge of the opening does not cross the markers.

6 Claims, 6 Drawing Sheets

(56) References Cited

U.S. PATENT DOCUMENTS

| | | | | |
|---|---|---|---|---|
| 11,148,808 B2* | 10/2021 | Wiggerich | | B64U 30/26 |
| 11,180,253 B1* | 11/2021 | Seeley | | B64D 1/16 |
| 11,198,519 B1* | 12/2021 | Seeley | | B64F 1/002 |
| 11,370,561 B2* | 6/2022 | Ratajczak | | B60L 53/36 |
| 11,884,422 B2* | 1/2024 | Lowe | | B64F 1/007 |
| 12,065,273 B2* | 8/2024 | Kiyokami | | B64U 10/13 |
| 2007/0176432 A1* | 8/2007 | Rolt | | F03D 9/255 |
| | | | | 290/55 |
| 2008/0217486 A1* | 9/2008 | Colten | | B64U 10/25 |
| | | | | 244/45 R |
| 2009/0057486 A1* | 3/2009 | Becht, IV | | B64F 1/007 |
| | | | | 244/114 R |
| 2010/0170993 A1* | 7/2010 | Misegades | | B64C 7/00 |
| | | | | 244/130 |
| 2010/0320313 A1* | 12/2010 | Hanafin | | B64F 1/125 |
| | | | | 244/114 R |
| 2011/0174925 A1* | 7/2011 | Ying | | B64F 1/005 |
| | | | | 701/16 |
| 2013/0233964 A1* | 9/2013 | Woodworth | | B64U 10/60 |
| | | | | 244/175 |
| 2014/0032034 A1* | 1/2014 | Raptopoulos | | G05D 1/0088 |
| | | | | 701/25 |
| 2014/0070052 A1* | 3/2014 | Kang | | B64F 1/007 |
| | | | | 244/114 R |
| 2015/0158599 A1* | 6/2015 | Sisko | | B64F 1/20 |
| | | | | 244/114 R |
| 2015/0175276 A1* | 6/2015 | Koster | | A47G 29/14 |
| | | | | 244/114 R |
| 2015/0336677 A1* | 11/2015 | Smaoui | | B64C 39/02 |
| | | | | 320/109 |
| 2016/0001883 A1* | 1/2016 | Sanz | | B64U 10/13 |
| | | | | 244/17.23 |
| 2016/0068264 A1* | 3/2016 | Ganesh | | G06Q 30/0641 |
| | | | | 701/4 |
| 2016/0101856 A1* | 4/2016 | Kohstall | | G05D 1/0669 |
| | | | | 244/17.23 |
| 2016/0144982 A1* | 5/2016 | Sugumaran | | B64F 1/005 |
| | | | | 244/108 |
| 2016/0196756 A1* | 7/2016 | Prakash | | B64U 70/95 |
| | | | | 701/3 |
| 2016/0257426 A1* | 9/2016 | Mozer | | B64F 1/362 |
| 2016/0286128 A1* | 9/2016 | Zhou | | H04L 65/1069 |
| 2016/0291445 A1* | 10/2016 | Fisher, Sr. | | F16M 11/10 |
| 2016/0304217 A1* | 10/2016 | Fisher | | B60L 53/51 |
| 2016/0311329 A1* | 10/2016 | Rodriguez | | B60L 58/18 |
| 2016/0340021 A1* | 11/2016 | Zhang | | B64C 27/006 |
| 2016/0355261 A1* | 12/2016 | Chin | | B64U 70/20 |
| 2016/0364989 A1* | 12/2016 | Speasl | | G08G 5/0069 |
| 2016/0378108 A1* | 12/2016 | Paczan | | B64U 30/20 |
| | | | | 705/330 |
| 2017/0011333 A1* | 1/2017 | Greiner | | G06K 7/10722 |
| 2017/0023949 A1* | 1/2017 | Fisher | | G08G 5/0078 |
| 2017/0050749 A1* | 2/2017 | Pilskalns | | B60L 53/14 |
| 2017/0081043 A1* | 3/2017 | Jones | | B64C 37/02 |
| 2017/0096075 A1* | 4/2017 | Henry | | G05D 1/0027 |
| 2017/0121023 A1* | 5/2017 | High | | B64D 9/00 |
| 2017/0129464 A1* | 5/2017 | Wang | | H02J 7/0045 |
| 2017/0129603 A1* | 5/2017 | Raptopoulos | | B64U 70/92 |
| 2017/0225782 A1* | 8/2017 | Kohstall | | B64U 30/26 |
| 2017/0275025 A1* | 9/2017 | Johnson | | B64F 1/362 |
| 2017/0323129 A1* | 11/2017 | Davidson | | G05D 1/0234 |
| 2018/0039286 A1* | 2/2018 | Tirpak | | B64U 80/25 |
| 2018/0196418 A1* | 7/2018 | Meier | | G05D 1/0206 |
| 2018/0233055 A1* | 8/2018 | Damnjanovic | | G08G 5/0021 |
| 2018/0319496 A1* | 11/2018 | Zhang | | B64U 20/50 |
| 2018/0327091 A1* | 11/2018 | Burks | | B64U 50/13 |
| 2019/0016476 A1* | 1/2019 | Scherz | | H02J 7/0042 |
| 2019/0023133 A1* | 1/2019 | Renold | | B60L 53/30 |
| 2019/0047462 A1* | 2/2019 | Vijayaraghavan | | B60W 30/00 |
| 2019/0055018 A1* | 2/2019 | Bei | | B64U 70/92 |
| 2019/0100108 A1* | 4/2019 | Davis | | B64U 80/84 |
| 2019/0161190 A1* | 5/2019 | Gil | | G01S 19/15 |
| 2019/0217952 A1* | 7/2019 | Zawadzki | | B64D 1/02 |
| 2019/0233107 A1* | 8/2019 | Tian | | B64C 39/12 |
| 2019/0245365 A1* | 8/2019 | Farrahi Moghaddam | | |
| | | | | H02J 7/0042 |
| 2019/0256207 A1* | 8/2019 | Nohmi | | G05D 1/0866 |
| 2019/0283871 A1* | 9/2019 | Wieczorek | | B64U 10/60 |
| 2019/0383052 A1* | 12/2019 | Blake | | B60L 53/30 |
| 2020/0017237 A1* | 1/2020 | Walker | | B64D 45/04 |
| 2020/0044463 A1* | 2/2020 | Kim | | B64U 50/37 |
| 2020/0165008 A1* | 5/2020 | Krauss | | B64U 80/25 |
| 2020/0207484 A1* | 7/2020 | Foggia | | B64U 70/92 |
| 2020/0218287 A1* | 7/2020 | Wang | | B64U 50/34 |
| 2020/0218288 A1* | 7/2020 | Johnson | | B64U 30/26 |
| 2020/0239138 A1* | 7/2020 | Raptopoulos | | G08G 5/0069 |
| 2020/0369408 A1* | 11/2020 | Dolata | | B64U 30/20 |
| 2020/0406773 A1* | 12/2020 | Lacaze | | G05D 1/0094 |
| 2021/0053677 A1* | 2/2021 | Passley | | B64U 70/95 |
| 2021/0284356 A1* | 9/2021 | Jourdan | | G08G 5/025 |
| 2021/0300591 A1* | 9/2021 | Tian | | B64F 1/007 |
| 2021/0354820 A1* | 11/2021 | Hiller | | B60L 53/12 |
| 2022/0019247 A1* | 1/2022 | Dayan | | B64F 1/222 |
| 2022/0041279 A1* | 2/2022 | Rowse | | G05D 1/104 |
| 2022/0073214 A1* | 3/2022 | Liske | | B64U 50/19 |
| 2022/0169400 A1* | 6/2022 | Seeley | | B64F 1/322 |
| 2023/0399132 A1* | 12/2023 | Kiyokami | | B64F 1/18 |

* cited by examiner

TAKEOFF AND LANDING ASSIST APPARATUS

This application claims priority to Japanese Patent Application No. 2022-139111 filed on Sep. 1, 2022, which is incorporated herein by reference in its entirety including the specification, claims, drawings, and abstract.

TECHNICAL FIELD

The present disclosure relates to a takeoff and landing assist apparatus for a flying object.

BACKGROUND

Flying objects such as drones and unmanned aerial vehicles (UAV) are known.

German Patent Application Publication No. 102018205880 describes a drone port that allows a drone to land on the roof of a vehicle.

A takeoff and landing surface of a stage, such as the drone port, may have markers formed thereon to identify a relative position between a flying object and the stage. The flying object lands on the stage by using the markers as landmarks. This improves the landing accuracy.

The takeoff and landing surface may also have an opening through which loading and unloading to and from the flying object is carried out. The opening is generally provided with a lid that can be opened and closed. If the marker is formed to extend across the lid and the rest of the surface, the markers may be divided when the lid is open, and the markers may fail to function as the landmarks. As a result, the markers are not properly recognized by the flying object, resulting in a decrease in landing accuracy of the flying object.

An object of the present disclosure is therefore to prevent or reduce a decrease in accuracy of landing of the flying object using the markers to identify a relative position between the flying object and the stage when the takeoff and landing assist apparatus forming the markers is used.

SUMMARY

According to an aspect of the present disclosure, a takeoff and landing assist apparatus is provided, and the takeoff and landing assist apparatus includes a stage having a takeoff and landing surface that a flying object takes off from and lands on, and an opening that is formed in the takeoff and landing surface and through which loading and unloading to and from the flying object is carried out. In this apparatus, a marker for identifying a relative position between the flying object and the stage is formed on the takeoff and landing surface, and the opening is formed in the takeoff and landing surface such that an edge of the opening does not cross the marker.

In this configuration, the edge of the opening does not cross the marker, and the marker is thus not divided by the opening. It is therefore possible to prevent the flying object from erroneously recognizing the marker, thereby preventing or reducing a decrease in landing accuracy of the flying object.

The takeoff and landing assist apparatus may further have a lid that is provided in the opening and can be opened and closed. The lid may have a visual recognition assist surface on its edge, and the visual recognition assist surface may have a color that differs from that of the marker and is the same as that of a portion of the takeoff and landing surface where the marker is not formed.

According to the present disclosure, when the takeoff and landing assist apparatus forming the markers to identify a relative position between the flying object and the stage is used, a decrease in accuracy of landing of the flying object using the markers can be prevented or reduced.

BRIEF DESCRIPTION OF DRAWINGS

An embodiment of the present disclosure will be described based on the following figures, wherein.

DESCRIPTION OF EMBODIMENT

Figure 1:
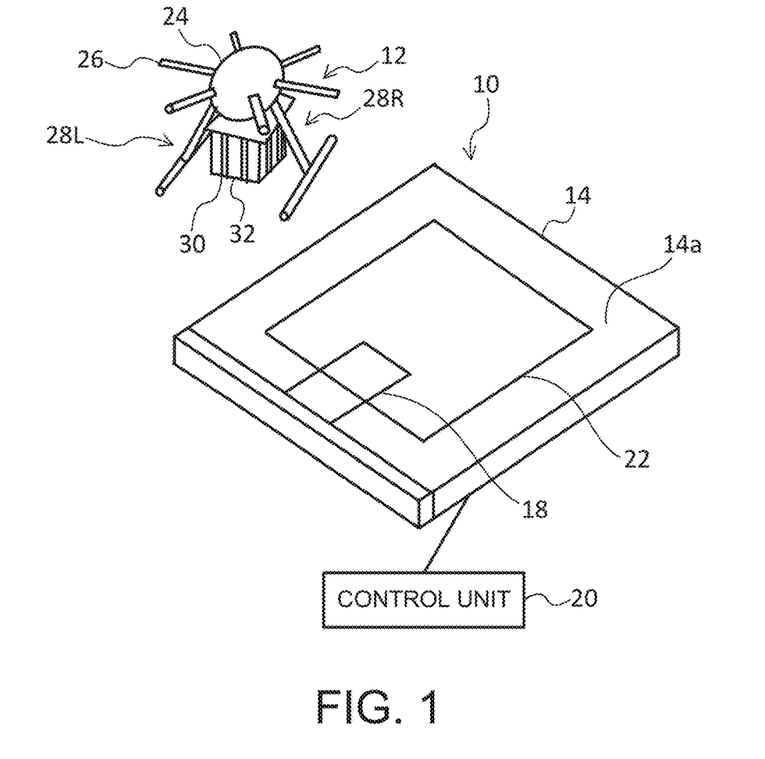
FIG. 1 is a perspective view showing a takeoff and landing assist apparatus and a flying object before landing.
Figure 2:
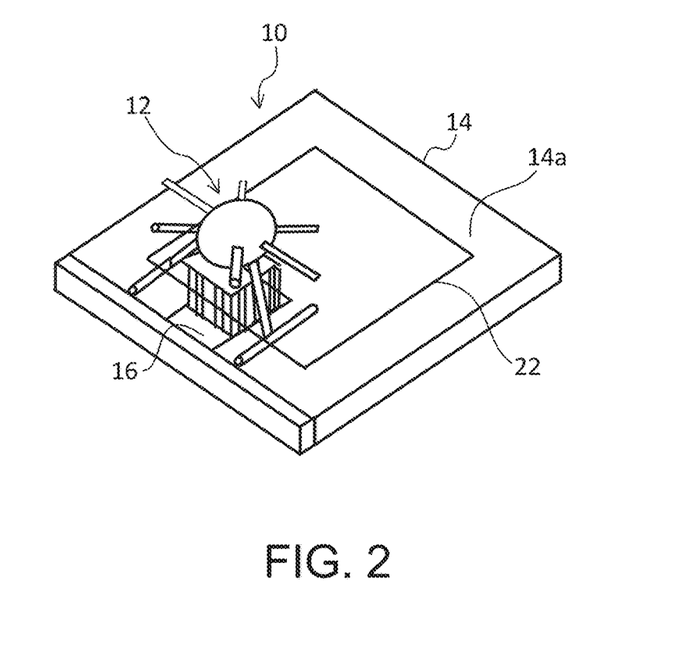
FIG. 2 is a perspective view showing the takeoff and landing assist apparatus and the flying object after landing.

A takeoff and landing assist apparatus 10 according to an embodiment will be described with reference to FIGS. 1 and 2. FIGS. 1 and 2 are perspective views showing the takeoff and landing assist apparatus 10 and a flying object 12.

The takeoff and landing assist apparatus 10 is an apparatus that assists the flying object 12 in taking off and landing. The flying object 12 is a drone, unmanned aerial vehicle, or the like. When a drone is used as the flying object 12, the takeoff and landing assist apparatus 10 may be referred to as a drone port. For example, loading and unloading to and from the flying object 12, feeding power to the flying object 12, replacing parts of the flying object 12, and storing the flying object 12 are performed through the takeoff and landing assist apparatus 10.

The takeoff and landing assist device 10 includes a stage 14, an opening 16, a lid 18, and a control unit 20.

The stage 14 is a stage that the flying object 12 takes off from and lands on and has an overall rectangular shape. Specifically, the stage 14 has a takeoff and landing surface 14a, and the flying object 12 lands on and takes off from the takeoff and landing surface 14a.

As shown in FIG. 2, the takeoff and landing surface 14a has the opening 16 formed therein. A mechanism for transferring a package 32 to and from the flying object 12 is provided under the stage 14. The package 32 is transferred between this mechanism and the flying object 12 through the opening 16. The package 32 on the flying object 12 is transported to the underside of the stage 14 through the opening 16, and the package 32 is loaded onto the flying object 12 through the opening 16. The flying object 12 may be powered through the opening 16.

The opening 16 is provided with the lid 18 that can be opened and closed. The lid 18 forms a portion of the stage 14. The lid 18 is opened when loading and unloading and power supply are performed. The lid 18 is closed at any other time. The lid 18 is opened and closed by means of, for example, a motor under the control of the control unit 20. For example, the lid 18 is moved in a direction orthogonal to the takeoff and landing surface 14a (vertical direction) by the driving force of the motor. When the lid 18 is moved below the stage 14, the opening 16 is open. When the lid 18 is moved to the same height as the takeoff and landing surface 14a, the opening 16 is closed by the lid 18.

The takeoff and landing surface 14a has a marker forming area 22 defined thereon. A plurality of markers are formed in the marker forming area 22. The markers are omitted in FIGS. 1 and 2. The marker is a figure or pattern for identifying a relative position between the flying object 12 and the stage 14. For example, the marker may be a bar code or a two-dimensional code. The marker will be explained in more detail below.

A camera or radar may be installed on the stage 14 to detect the flying object 12.

The control unit 20 controls, for example, power supply to the flying object 12 and opening and closing of the lid 18. The control unit 20 also has communication equipment to communicate with other devices by using wireless or wired communication technology. For example, the control unit 20 may communicate with other devices via communication paths such as the Internet, a wireless network, or a local area network (LAN), or it may communicate with them by using short-range wireless communication technology. For example, the control unit 20 communicates with the flying object 12 by using wireless communication technology.

The control unit 20 is, for example, a computer with a processor, such as a central processing unit (CPU), and a memory. The processor executes a program stored in the memory to thereby realize the functions of the control unit 20. The control unit 20 may be an electronic circuit, a digital signal processor (DSP), or a field programmable gate array (FPGA), for example.

The flying object 12 includes a body 24, a rotor 26 for flight, a pair of legs 28R and 28L, and a gripping mechanism 30. A known drone or unmanned aerial vehicle can be used as the flying object 12.

The flying object 12 includes, for example, a battery, a motor for driving the rotor 26, sensors (a gyro sensor, an acceleration sensor, a magnetometer, a barometric pressure sensor, a Global Positioning System (GPS), etc.), a camera, a radar, a flight computer for controlling the flying object 12, drivers, and communication equipment using wireless or wired communication technology.

The flight computer controls the motor to thereby control the flight of the flying object 12 (ascending, descending, horizontal movement, etc.) and the attitude of the flying object 12 based on information acquired by the gyro sensor.

Each of the legs 28R and 28L includes a bar-shaped support leg portion extending downward from the body 24, and a bar-shaped horizontal leg portion attached to the support leg portion and extending horizontally. The legs 28R and 28L support the flying object 12 when it lands on the stage 14.

The gripping mechanism 30 is installed on the lower part of the body 24 and grips the package 32. The flying object 12 carries the package 32 with the package 32 gripped by the gripping mechanism 30.

As shown in FIG. 2, the flying object 12 performs loading and unloading at the position of the opening 16 above the takeoff and landing surface 14a while gripping the package 32. The flying object 12 lands at a position other than the opening 16 on the takeoff and landing surface 14a and is then moved to the position of the opening 16 by a moving mechanism (not shown).

The flying object 12 is controlled, for example, by means of a terminal device or server. The terminal device is, for example, a controller for a drone, a smartphone, a tablet device, or the like. The terminal device or server controls the flying object 12 by transmitting to the flying object 12 a control command signal indicating a command to maneuver the flying object 12. The communication equipment of the flying object 12 receives the control command signal transmitted from the terminal device or server, and the flight computer of the flying object 12 controls the flight and attitude of the flying object 12 according to the control command signal. The flying object 12 may be controlled by the control unit 20.

Figure 3:
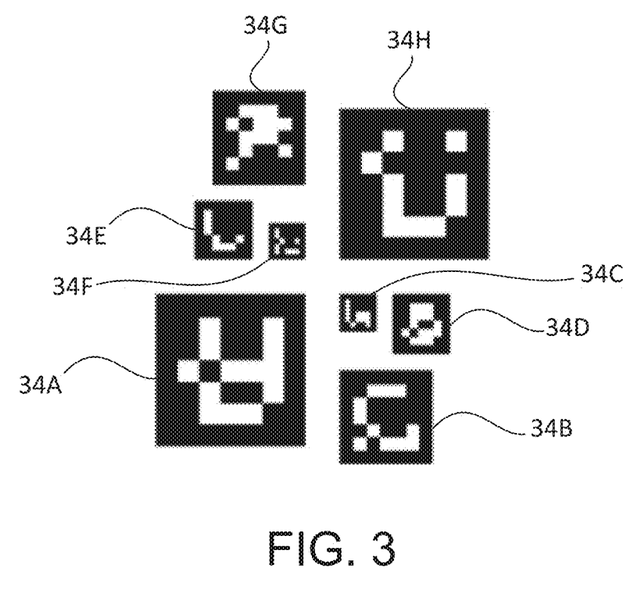
FIG. 3 is a view showing an example of markers formed on a takeoff and landing surface.

FIG. 3 shows an example of markers formed in the marker forming area 22. Markers 34A to 34H are two-dimensional codes, such as QR codes (registered trademark). No particular limitation is imposed on the shape and size of each of the markers.

Figure 4:
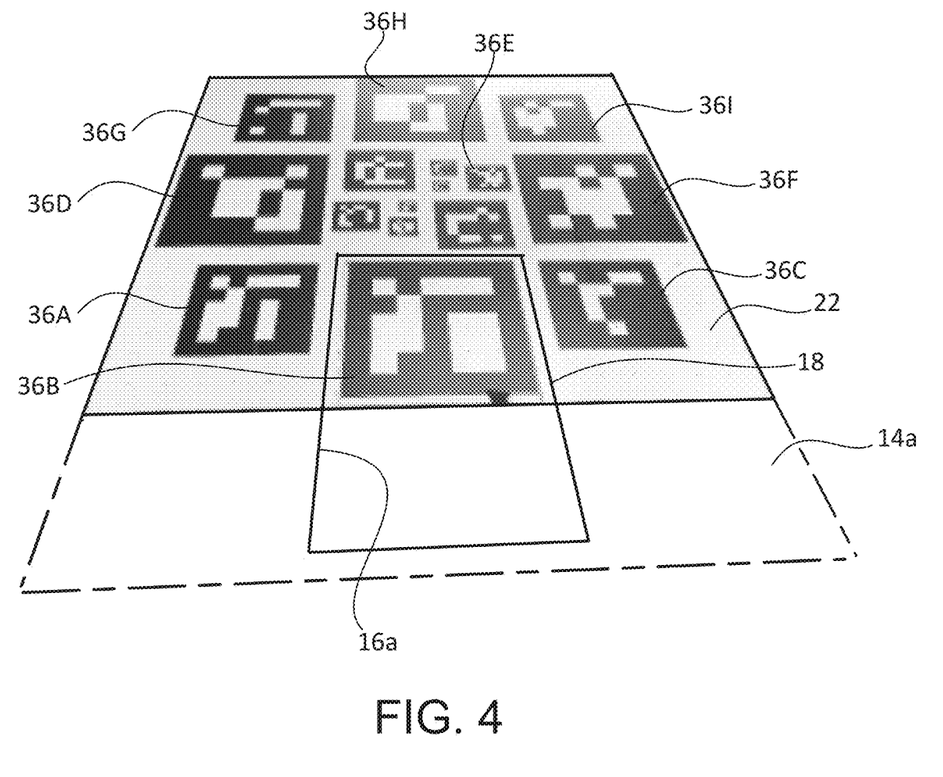
FIG. 4 is a perspective view showing a marker forming area when an opening is closed.
Figure 5:
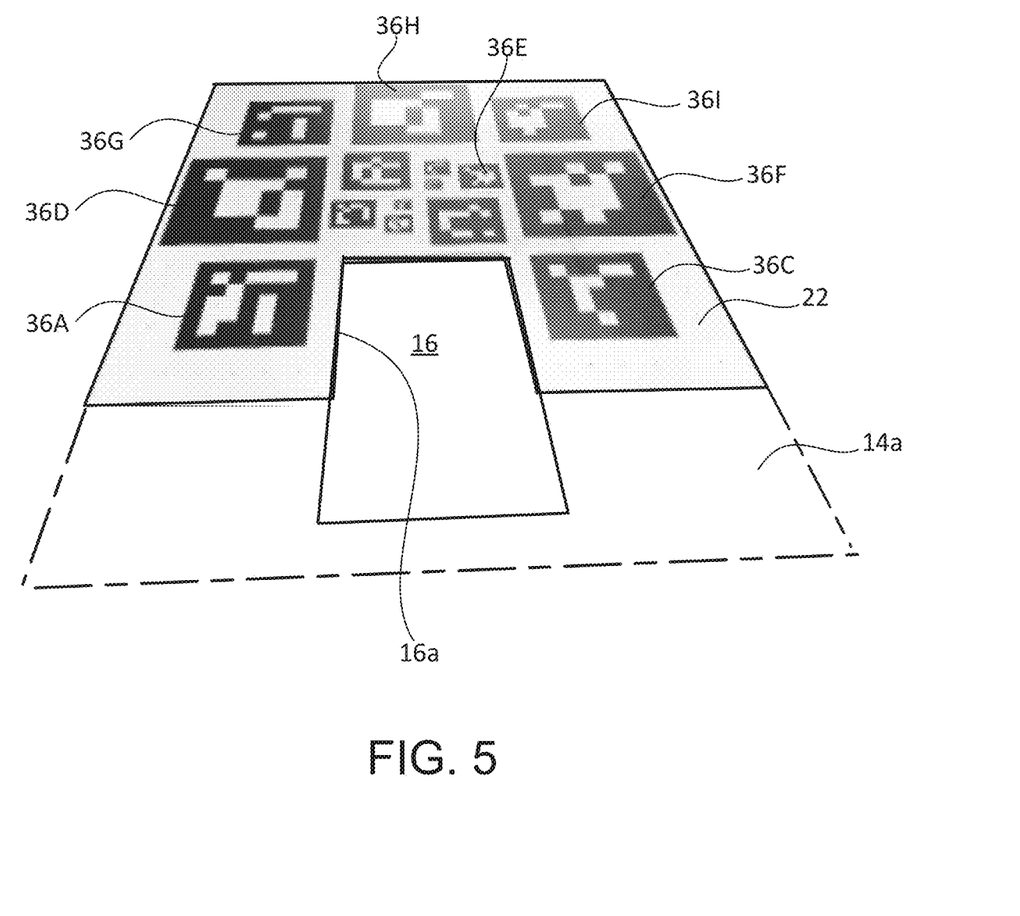
FIG. 5 is a perspective view showing the marker forming area when the opening is open.
Figure 6:
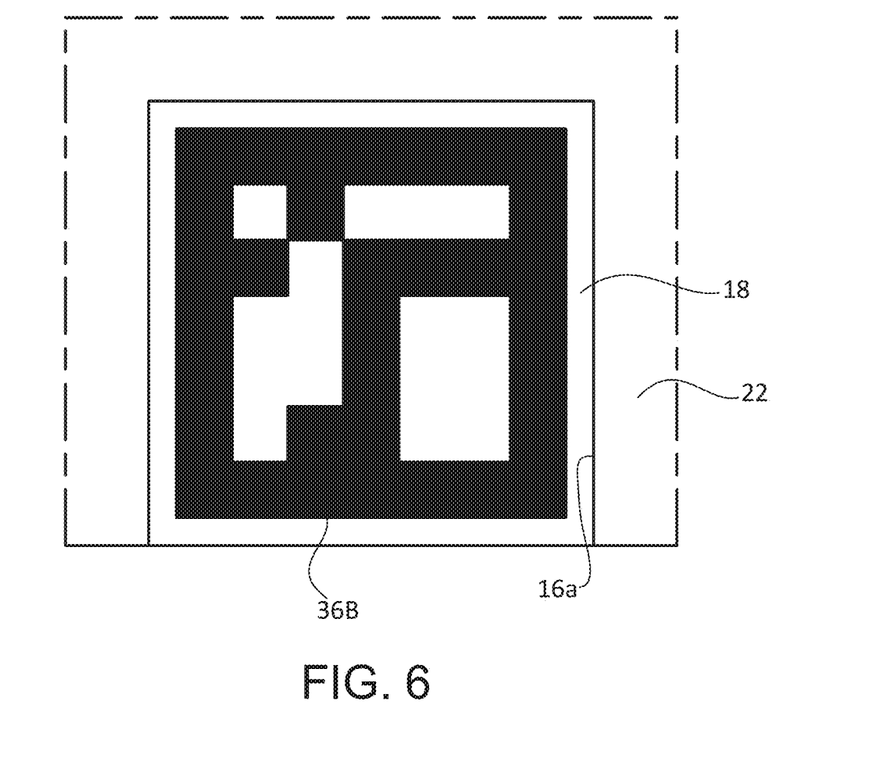
FIG. 6 is a view of a lid in the opening viewed from above.

FIGS. 4 to 6 show examples of the markers formed in the marker formation area 22. FIGS. 4 and 5 are perspective views showing the marker forming area 22. In the example shown in FIG. 4, the opening 16 is closed. In the example shown in FIG. 5, the lid 18 is moved to the underside of the stage 14, and the opening 16 is open. FIG. 6 shows the lid 18 and its surroundings viewed from above.

A plurality of markers are formed in the marker forming area 22. Here, as an example, markers 36A, 36B, 36C, . . . , and 36I are formed in the marker forming area 22. The markers 36A, 36B, 36C, . . . , and 36I are two-dimensional codes with different patterns. As in an example of the marker 36E, a single marker may be composed of several smaller marker elements. In addition, the marker 36B is formed on a surface of the lid 18. Hereinafter, when it is not necessary to distinguish between the markers 36A, 36B, 36C, . . . , and 36I, they will be referred to as "markers 36."

The marker 36B may be larger in size than the other markers 36. This allows the flying object 12 to clearly read the marker 36B and recognize the marker 36B correctly even when the lid 18 is moved to the underside of the stage 14. The border (frame) of the marker 36B may also be thicker than those of the other markers 36. This also allows the flying object 12 to clearly read the marker 36B even when the lid 18 is moved to the underside of the stage 14.

Each marker 36 is associated with a particular position on the takeoff and landing surface 14a, and information indicating this corresponding relationship is stored in advance in a memory of the flying object 12.

For example, a camera mounted on the flying object 12 captures an image of one of the markers 36. The flight computer recognizes this marker 36 based on the captured image and identifies a position associated with the marker 36 by referring to the information indicating the above corresponding relationship. Thus, a position of the flying object 12 relative to the takeoff and landing surface 14a is identified. The flying object 12 controls its own position in the air based on the identified relative position to land at a desired position on the takeoff and landing surface 14a.

The marker 36 may be associated with a maneuvering command, such as "move forward" or "stop." The flying object 12 may adjust its position in the air according to the maneuvering command associated with the marker 36 imaged by the camera.

The opening 16 is formed in the takeoff and landing surface 14a such that an edge 16a of the opening 16 does not cross the markers. As shown in FIG. 6, for example, the marker 36B is not formed to extend across the surface of the lid 18 and the rest of the marker forming area 22. It is formed only on the surface of the lid 18. In other words, as shown in FIGS. 4 and 5, the edge 16a of the opening 16 is formed between the marker 36A and the marker 36B, between the marker 36B and the marker 36C, and between the marker 36B and the marker 36E, and does not cross the markers 36.

Figure 7:
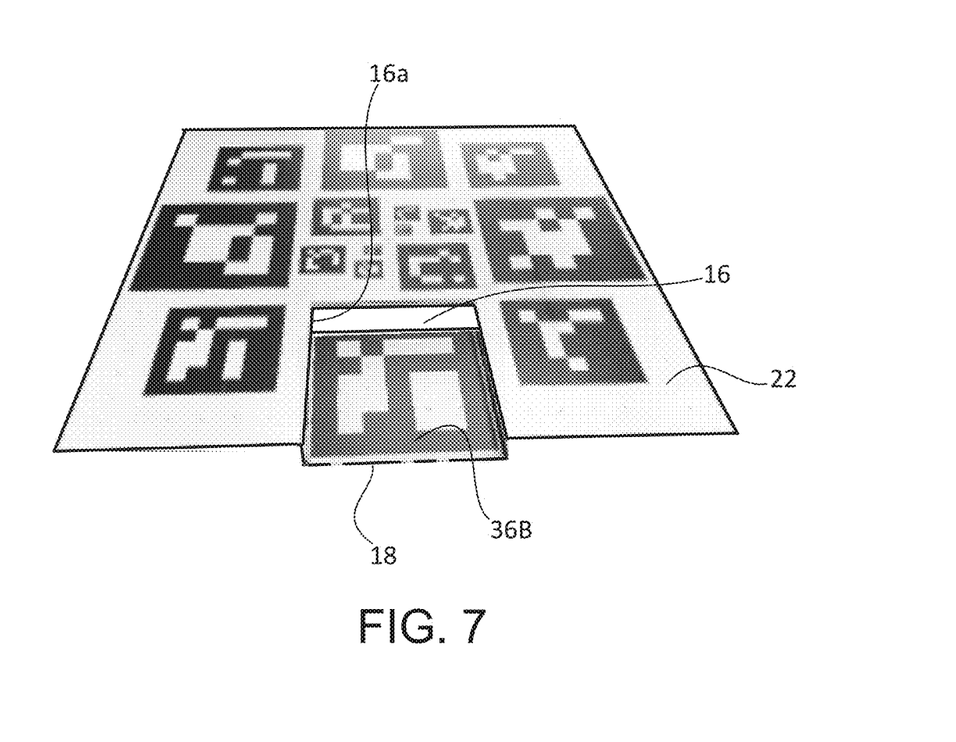
FIG. 7 is a perspective view showing the marker forming area in the process of opening the opening.

FIG. 7 shows the marker forming area 22 in the process of opening the opening 16. The lid 18 is moved halfway below the stage 14, and the opening 16 is open. Because the edge 16a of the opening 16 does not cross the markers 36, no marker 36 is divided by the opening 16 even when the lid 18 is moved below the stage 14 to open the opening 16. For example, the marker 36B is formed only on the surface of the lid 18, and therefore, the edge 16a of the opening 16 does not cross the marker 36B when the lid 18 is moved below the stage 14, and the marker 36B is not divided by the opening 16.

Because the markers 36 are not divided by the opening 16, it is possible to prevent the flying object 12 from misrecognizing the markers 36 when the opening 16 is open. As a result, a decrease in landing accuracy of the flying object 12 can be prevented or reduced.

Figure 8:
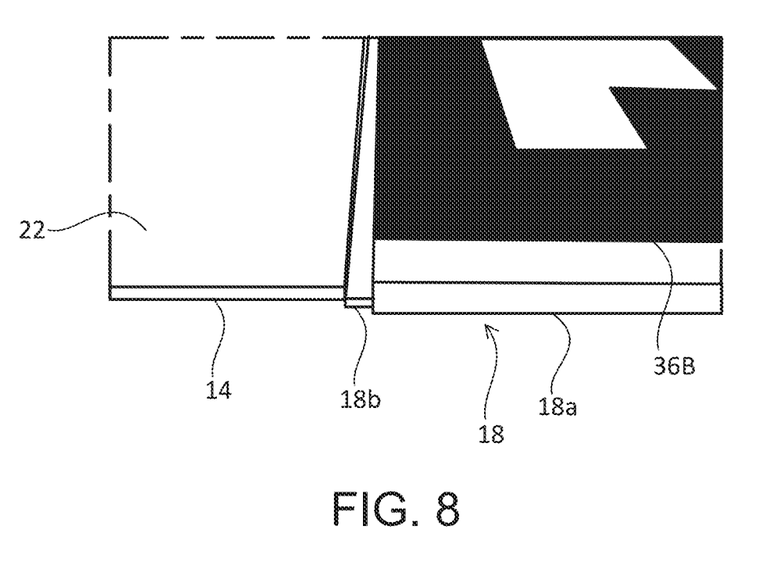
FIG. 8 is a perspective view showing the lid that is provided in the opening and is closed, along with its surroundings.
Figure 9:
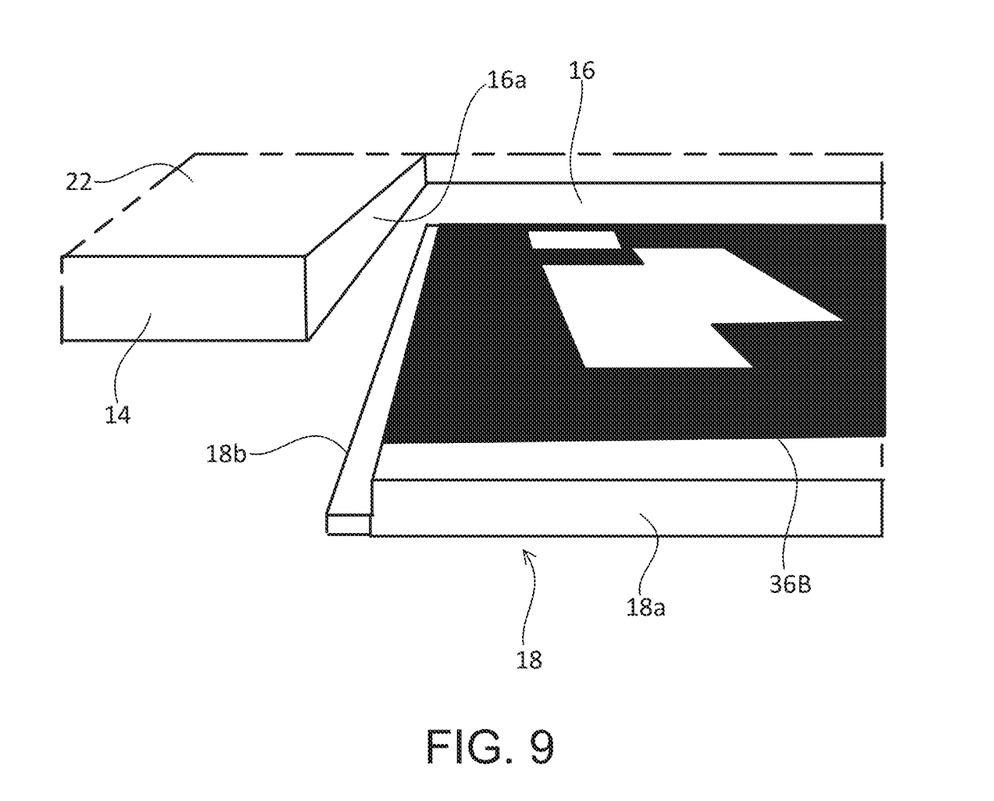
FIG. 9 is a perspective view showing the lid that is provided in the opening and is partially closed, along with its surroundings.

The structure around an edge of the lid 18 will be described with reference to FIGS. 8 and 9. FIGS. 8 and 9 are perspective views showing a portion of the lid 18 and a portion of the marker forming area 22. In an example shown in FIG. 8, the opening 16 is closed. In an example shown in FIG. 9, the opening 16 is half open.

The lid 18 is composed of a lid body 18a and a visual recognition assist surface 18b. The marker 36B is formed on the surface of the lid body 18a. The visual recognition assist surface 18b is a member provided along an edge of the lid body 18a. The visual recognition assist surface 18b is smaller in thickness than the lid body 18a. The visual recognition assist surface 18b is provided below the surface of the lid body 18a with respect to the stage 14. The visual recognition assist surface 18b thus forms a step along the edge of the lid 18. As shown in FIG. 8, when the lid 18 is positioned at the same height as the takeoff and landing surface 14a, and the opening 16 is closed, the visual recognition assist surface 18b is located in a gap between the lid body 18a and a portion of the stage 14 other than the lid 18.

The visual recognition assist surface 18b has a color that differs from that of the marker 36B formed on the surface of the lid body 18a and is the same as that of a portion of the takeoff-landing surface 14a where no marker is formed. Specifically, the color of the visual recognition assist surface 18b is the same as that of the portion of the marker forming area 22 where no marker 36 is formed. For example, if the color of the marker 36B is black, and the color of the portion of the marker forming area 22 where no marker 36 is formed is white, the color of the visual recognition assist surface 18b is white.

Thus, because the color of the visual recognition assist surface 18b differs from that of the marker 36B and is the same as that of the portion of marker forming area 22 where no marker 36 is formed, it is easier for the flying object 12 to recognize the marker 36B. That is, the difference in shading between the marker 36B and the area other than the marker 36B becomes clearer, the marker 36B can be recognized more accurately.

If the color of the visual recognition assist surface 18b is the same as that of the marker 36B (for example, black), the marker 36B is difficult to recognize, because the boundary between the marker 36B and the area other than the marker 36B is unclear. In contrast, in the present embodiment, the boundary between the marker 36B and the area other than the marker 36B is clear, and the marker 36B is recognized accurately.

The takeoff and landing assist apparatus 10 may be installed on objects or locations where movement is not expected, such as the ground, roads, and buildings, or on objects or locations where movement is expected, such as moving vehicles (vehicles such as automobiles, trains, ships, airplanes, etc.). For example, the takeoff and landing assist apparatus 10 may be installed on the roof of a vehicle or the roof of a building.

The invention claimed is:

1. A takeoff and landing assist apparatus, comprising:
a stage having a takeoff and landing surface that a flying object takes off from and lands on; an opening that is formed in the takeoff and landing surface and through which loading and unloading to and from the flying object is carried out; and
a lid provided at the opening and configured to open and close the opening, the lid includes
a lid body, and
an edge portion, at an edge of the lid body, having a thickness less than that of the lid body and defining a step along an edge of the lid, wherein the edge portion includes a visual recognition assist surface positioned lower than a surface of the lid body in a vertical direction, wherein
a marker for identifying a relative position between the flying object and the stage is formed on the takeoff and landing surface,
the opening is formed in the takeoff and landing surface such that an edge of the opening does not cross the marker, and
the visual recognition assist surface has a color different from that of the marker and same as that of a portion of the takeoff and landing surface where the marker is not formed.

2. The takeoff and landing assist apparatus according to claim 1, wherein
the lid is configured to open the opening by moving to an underside of the stage.

3. The takeoff and landing assist apparatus according to claim 2, further comprising:
a camera or a radar installed on the stage and configured to detect the flying object.

4. The takeoff and landing assist apparatus according to claim 3, further comprising:
a plurality of markers including the marker, wherein
each of the plurality of markers is associated with a predetermined position on the takeoff and landing surface.

5. The takeoff and landing assist apparatus according to claim 4, wherein
the plurality of markers includes a first marker and a second marker having a size different from that of the first marker.

6. The takeoff and landing assist apparatus according to claim 5, wherein
the plurality of markers is associated with a maneuvering command for maneuvering the flying object.

* * * * *